United States Patent [19]

Satake et al.

[11] Patent Number: 4,561,084
[45] Date of Patent: Dec. 24, 1985

[54] DISK LOADING AND UNLOADING SYSTEM

[75] Inventors: Mitsuo Satake; Shigekata Toyota, both of Toyokawa, Japan

[73] Assignees: Hitachi, Ltd.; Hitachi Video Engineering, both of Tokyo, Japan

[21] Appl. No.: 501,154

[22] Filed: Jun. 6, 1983

[30] Foreign Application Priority Data

Jun. 4, 1982 [JP] Japan ................................. 57-94968
Jun. 4, 1982 [JP] Japan ................................. 57-94969

[51] Int. Cl.⁴ ........................ G11B 17/04; G11B 19/16
[52] U.S. Cl. .................................................. 369/75.2
[58] Field of Search ............................. 369/75.2, 77.1

[56] References Cited

U.S. PATENT DOCUMENTS

| | | | |
|---|---|---|---|
| 3,223,422 | 12/1965 | Ernst | 369/77.1 |
| 3,446,505 | 5/1969 | Tiraboshi et al. | 369/77.1 |
| 3,484,111 | 12/1969 | Staar | 369/77.1 |
| 4,416,003 | 11/1983 | Suzuki | 369/75.2 |
| 4,439,850 | 3/1984 | Takahara et al. | 369/75.2 |

FOREIGN PATENT DOCUMENTS

| | | | |
|---|---|---|---|
| 76583 | 4/1983 | European Pat. Off. | 369/77.1 |
| 234753 | 2/1960 | United Kingdom | 369/77.1 |

Primary Examiner—Steven L. Stephan
Attorney, Agent, or Firm—Antonelli, Terry & Wands

[57] ABSTRACT

A disk loading and unloading system (5) including a disk holding section (10, 11, 15, 16, 23) mounted for pivotal movement with respect to a main body of the system. When the disk holding section is pivotally moved outwardly away from the main body, the disk holding section moves to an upper position in which at least a portion of a disk (6) supported in the disk holding section clears the disk holding section and is exposed to view. Thus the disk can be removed from the disk holding section by holding its side edge by hand.

11 Claims, 10 Drawing Figures

DISK LOADING AND UNLOADING SYSTEM

BACKGROUND AND SUMMARY OF THE INVENTION

This invention relates to disk loading and unloading systems, and, more particularly, to a disk loading and unloading system suitable for use with digital audio disk players, analog players, etc.

In loading a player with a disk, it has been customary to manually fit the disk to a spindle of a turntable. In unloading the disk, it was necessary to remove the disk from the spindle of the turntable by hand and then pull the disk out of the player.

Since disk loading and unloading have been carried out manually, the hand of the operator has inevitably been brought into contact with surfaces of the disk on which information is recorded, thereby providing opportunities for the disk to be soiled or damaged.

This invention has as its object the providing of a disk loading and unloading system enabling a disk to be mounted in a player and removed therefrom with the operator merely touching a peripheral edge of the disk, without the hand being brought into direct contact with surfaces of the disk on which information is stored.

The outstanding characteristic of the invention is that the disk loading and unloading system comprises a disk holding section which is pivotally movable with respect to a main body of the system. When the disk holding section is pivotally moved outwardly away from the main body, a disk inserted in the disk holding section moves upwardly to an upper position in which the disk is partly out of the disk holding section, so that the disk can be removed therefrom by holding same at its outer peripheral edge. To facilitate loading and unloading of the disk while holding the disk by hands, the disk is preferably moved upwardly so that a portion of the disk from the outer periphery thereof substantially to the vicinity of a center opening thereof clears the disk holding section to be exposed to view. To move the disk upwardly to the aforesaid upper position effectively, it is possible to let the disk holding section move in pivotal movement to a maximum while minimizing its linear movement, if the linear movement of a slider driven by a single motor is converted to a pivotal movement of elevation arms or the like. Thus, it is possible to move the disk upwardly to the position in which it sticks out of the disk holding section and downwardly to a position in which it is supported by the disk holding section.

DETAILED DESCRIPTION

A preferred embodiment of the invention will now be described by referring to the accompanying drawings.

Figure 1:
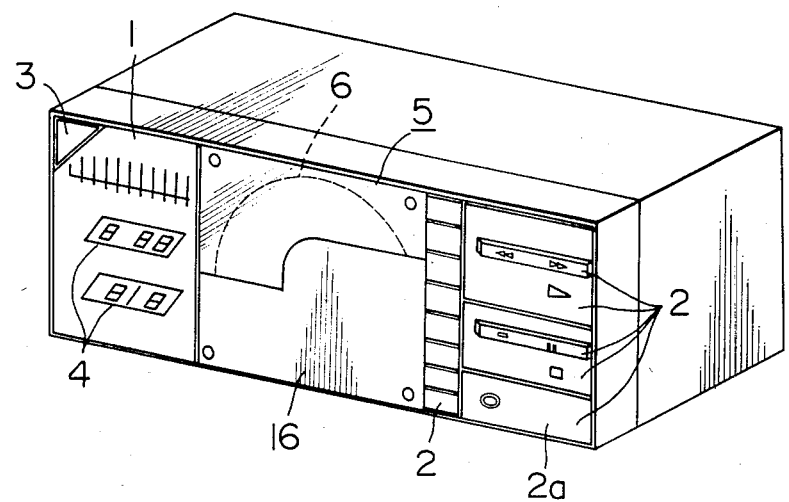
FIG. 1 is a perspective view of a compact digital audio disk player incorporating an embodiment of the invention therein, with a disk loaded therein.

In FIG. 1 a player for playing a compact digital audio disk of 12 cm in diameter, comprises a front panel 1 formed of synthetic resinous material or metal by die casting which covers the front of the player and has some decorative value, a series of knobs 2 for operating the player, a knob 3 for turning on and off a power source, indicating sections 4 for indicating the operating condition of the player, a disk loading and unlaoding section 5 and a disk 6 loaded in the player and placed in a playing position.

Figure 4:
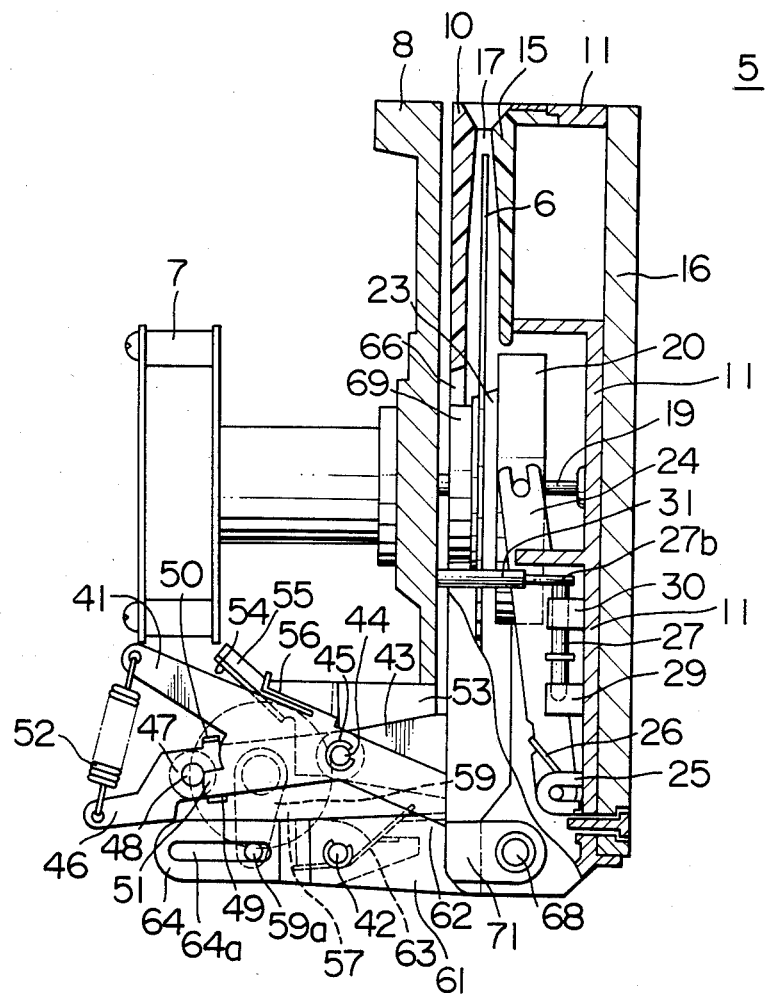
FIG. 4 is a left side view, with certain parts being shown in section, of the disk loading mechanism shown in FIG. 2.
Figure 5:
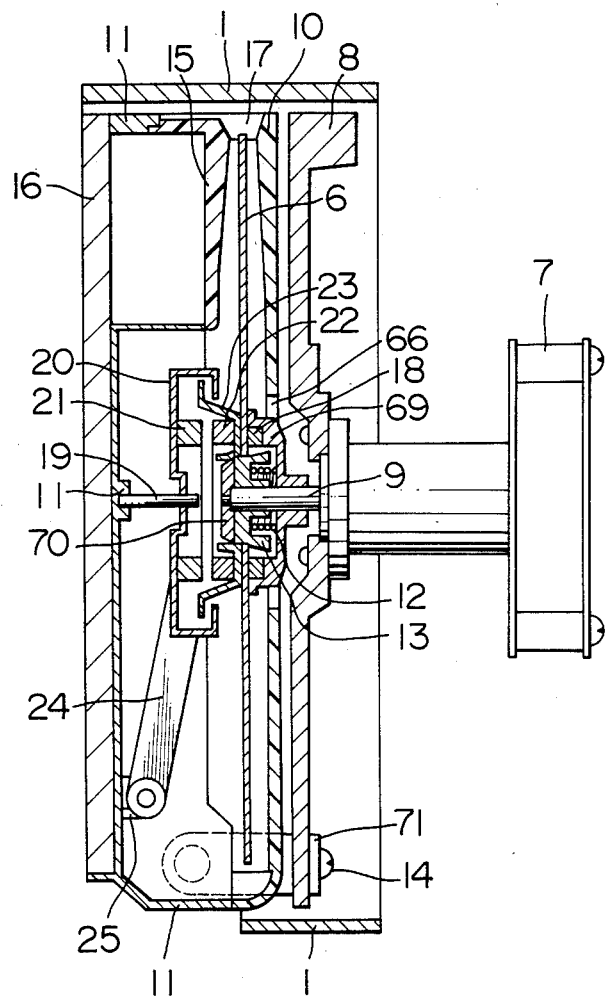
FIG. 5 is a vertical sectional view of the disk securing portion located in a central portion in FIG. 2.

As shown in FIGS. 4 and 5, a main motor 7 for rotatably driving the disk 6 is secured to a central portion of a unit plate 8 produced by die casting. The unit plate 8 has attached thereto for movement in a transverse direction a pickup (not shown), which is movable radially of the disk 6 and emanates a laser beam to read information stored in the disk 6. In FIG. 5, the main motor 7 includes a main shaft 9 having secured thereto a turntable 69 having a magnet 18 secured to a surface thereof facing the disk 6. The main shaft 9 has a center spindle 70 secured to its forward end. A disk guide 13 is fitted between the center spindle 70 and the turntable 69 for sliding movement axially of the main shaft 9. The disk guide 13 is normally urged by the biasing force of a spring 12 surrounding the main shaft 9 of the disk guide 13 and the turntable 69 to move the disk guide toward the center spindle 70. The disk guide 13 is provided with an inclined portion at an outer periphery thereof, which is in contact with a center opening formed on the disk 6, to thereby secure the disk 6 in place and position same at its center.

A back plate 10, formed of synthetic resinous material, is formed with a guide opening 66 for receiving the turntable 69 therein. The guide opening 66 is rectangular in shape and has a transverse dimension greater than the radius of the disk 6 to allow the pickup to move in a transverse direction to read the information stored in the disk 6. The back plate 10 is located in spaced juxtaposed relation to a disk holder 11 with a transparent clear guide 15 formed of synthetic resinous material and allowing the disk 6 to be viewed being interposed therebetween. The back plate 10 and the disk holder 11 are clamped together by screws at four corners to support therein a mechanism for moving the disk 6 in a vertical direction.

Figure 2:
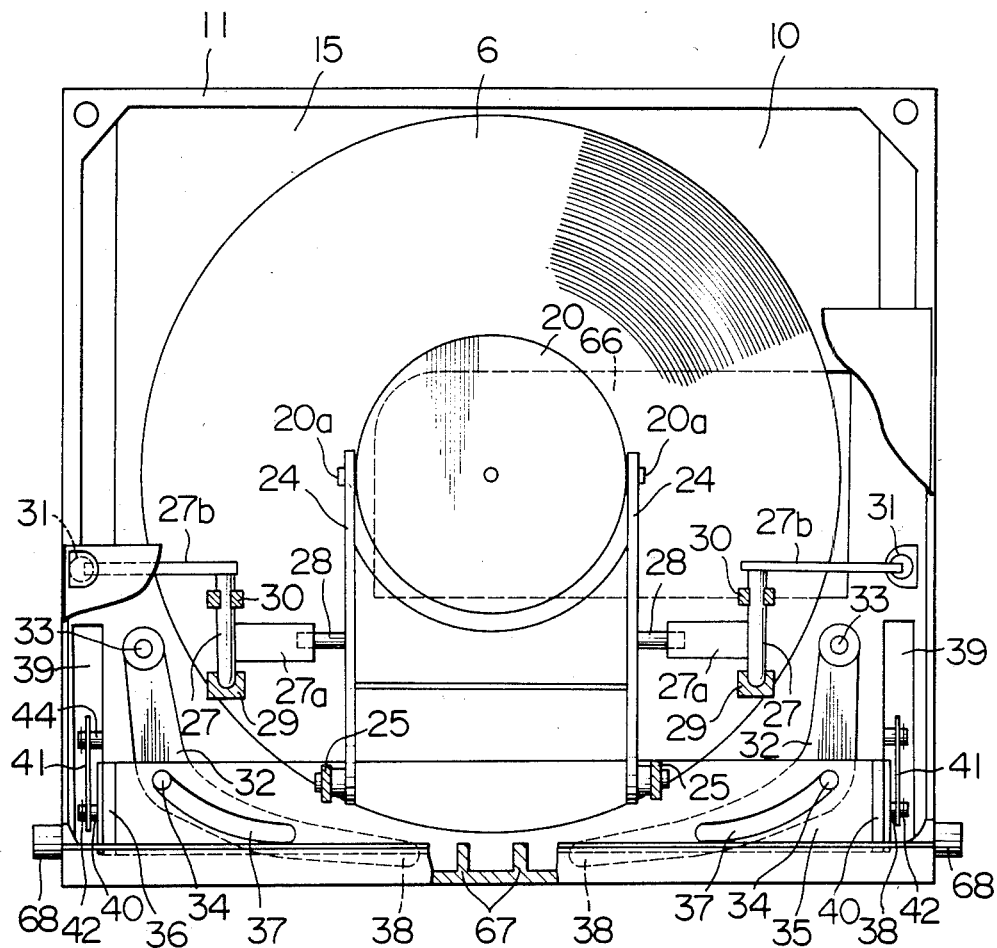
FIG. 2 is a front view, with certain parts being shown in section, of the disk loading mechanism of the disk player shown in FIG. 1, showing the internal structure by removing the loading blind.
Figure 7:
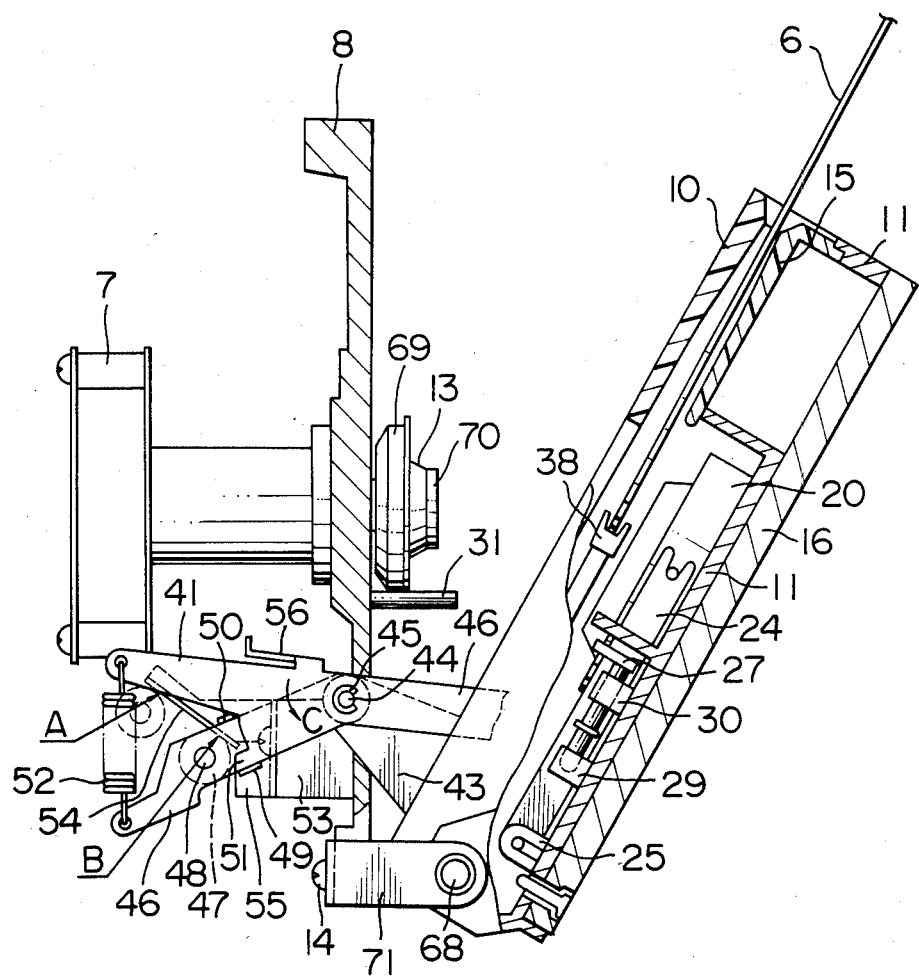
FIG. 7 is a side view, with certain parts being shown in section, of the pivotal arm for moving the disk holder in pivotal movement while the disk holder is in an open position.

As shown in FIG. 2, the disk holder 11 has projections 68 formed integrally therewith at lower portions of left and right sides thereof. The projections 68 are each inserted in a bearing opening formed at one leg of an L-shaped metal fitting 71 which is screwed at the other leg to the back surface of the unit plate 8 as indicated at 14 as shown in FIG. 7. This allows the back plate 10 unitary with the disk holder 11 to move forwardly in pivotal movement. A loading blind 16, which is transparent to allow the disk 6 to be viewed through the clear guide 15, is located in the front of the disk holder 11. The loading blind 16 is screwed to the back plate 10 at four corners and provided with a decorative design. As shown in FIGS. 4 and 5, a slot 17 for inserting the disk 6 therethrough is defined between the back plate 10 and the clear guide 15 at the tops thereof.

Referring to FIG. 5, means for securing the disk 6 in place are provided in front of the turntable 69 and the disk 6 leftwardly thereof in the figure. A clamp holder 20 is attached to a guide shaft 19 secured to the disk holder 11 for sliding movement leftwardly and rightwardly in the figure. The clamp holder 20 has secured thereto on a side thereof facing the disk 6 a magnet 21 which is of the same polarity as an opposed magnet 22, so that the magnets 21 and 22 repel each other. Fitted on an inner side of the clamp holder 20 is a disk clamper 23 which is fitted at its central portion to the center spindle 70. The magnet 22 is secured in a position on the disk clamper 23 opposite the magnet 21. The magnets 21 and 22 repel each other but the magnets 18 and 22 attract each other because they are of opposite polarities, to secure the disk 6 in place and rotate same together with the disk holder 11 as the latter is rotated by the motor 7.

Referring to FIG. 2 again, the clamp holder 20 has projections 20a on left and right sides thereof and each projection 20a is received in an opening formed at one end of one of a pair of clamp arms 24. Each of the clamp arms 24 has at the other end thereof a projection inserted in a bearing 25 which is mounted on the disk holder 11, so that the arms 24 will move in pivotal movement as the clamp holder 20 moves back and forth. As shown in FIG. 4, a wire spring 26 is wound around each projection of clamp arm 24 so that the clamp arms 24 are urged by the biasing forces of the wire springs 26 to move toward the loading blind 16. Thus, the biasing forces of the wire springs 26 act at all times in such a manner so as to weaken the forces of the magnets 18 and 22 attracting each other as described by referring to FIG. 5.

Referring to FIG. 2 again, the clamp arms 24 are each formed with a projection 28 located in a central portion thereof, the projections 28 are extending in opposite directions to left and right and are in engagement with projections 27a of clamp triggers 27. The clamp triggers 27 are rotatably journaled by bearings 29 and 30 mounted on the disk holder 11. The projections 28 are each in engagement with one of the projections 27a of the clamp triggers 27, and the triggers 27 each have an extension 27b extending in a direction opposite the direction in which the projections 27a extend. Each of the extensions 27b is in engagement with one of projections 31 which are each secured to the unit plate 8 and extending therefrom as shown in FIG. 4.

Referring to FIG. 2 again, projecting slide surfaces 36 are located on the left and right of a slider 35 in a box-like space between the back plate 10 and the disk holder 11. The projecting slide surfaces 36 are held between guides which are provided on the back plate 10 and the disk holder 11 respectively, for sliding movement in a vertical direction to enable elevation arms 32 to move in pivotal movement in a vertical direction. The elevation arms 32 which move in sliding movement while in contact with inner wall surfaces of the back plate 10 and the disk holder 11 have at one end thereof disk support portions 38 formed in a U-shape for supporting the disk 6 as clearly shown in FIG. 7. The elevation arms 32 have at the other end thereof shafts 33 which are connected thereto, extending through openings formed in the back plate 10 and secured in place as by E-rings on an outer surface of the back plate 10 for rotation. A slide projection 34 is connected to a central portion of each of the elevation arms 32 and received in one of guide openings 37 in the form of arcuate slots formed in the slider 35.

The slider 35 has slide projections 40 each connected to one of opposite ends thereof and received in an opening formed at one end portion of a connecting bar 41 and secured in place by an E-ring 42.

The connecting bars 41 each extend through openings formed in the back plate 10 and the unit plate 8 and rearwardly thereof. As shown in FIGS. 4 and 7, the back plate 10 has support portions 43 unitarily connected thereto and extending leftwardly therefrom in the figure. Each of the support portions 43 has connected thereto a pivot axis 44 which is received in an opening formed in a central portion of one of the connecting bars 41 and secured by a stop ring 45 for rotation. A pivot arm 46 extends between the support portion 43 and the connecting bar 41 with an opening formed at one end of the arm 46 being received by the pivot axis 44. The pivot arm 46 has connected thereto a roller support 48 for supporting a roller 47 for rotation. The connecting bar 41 is formed at one portion thereof with a projecting guide portion 51. The projecting guide portion 51 is held between stoppers 49 and 50 which are formed by bending portions of the pivot arm 46 and disposed in spaced juxtaposed relation with each other, to thereby limit the range of pivotal movement of the guide portion 51 which is a part of the connecting bar 41. An arm spring 52 is mounted between ends of the bar 41 and the arm 46, so that the connecting bar 41 and the pivot arm 46 pull each other inwardly with the pivot axis 44 and the stopper 49 serving as references.

Figure 3:
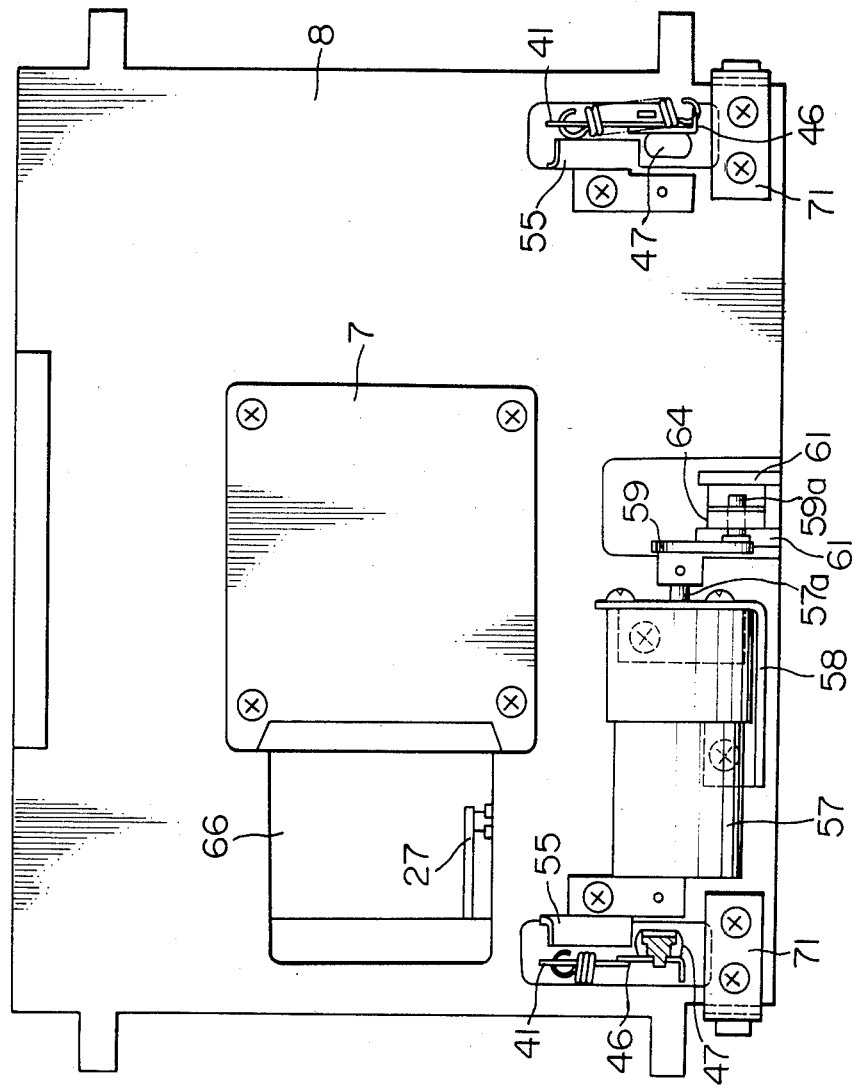
FIG. 3 is a rear view of the disk loading mechanism shown in FIG. 2.

Referring to FIGS. 3 and 7, inclined surfaces 55 each having an inclined surface 54 adapted to be brought into contact with one of the rollers 47 are screwed to one of base seats 53 which are unitarily connected to the unit plate 8. A stopper 56 formed by bending a portion of one of the connecting bars 41 is located in face-to-face relation to a back surface of the inclined surface 54 contacting the roller 47. A drive motor 57 for opening and closing the disk loading mechanism is secured to the unit plate 8 by screws through a motor base 58, as shown in FIG. 3. The drive motor 57 includes a motor shaft 57a having secured thereto by a screw one end of a drive arm 59. The drive arm 59 is received at a projection 59a connected to the other end thereof in a slot 64a of a drive lever 64 (see FIG. 6). Two drive bars 61 connected to the back plate 10 extend from a lower central portion thereof, and a stopper seat 62 also connected to the back plate 10 is interposed between the two drive bars 61 (see FIG. 4). The drive lever 64 is interposed between the two drive bars 61. A shaft 42 extends through the drive bars 61, the drive lever 64, a torsion coil spring 63 for rotation and is secured in place by an E-ring. The torsion coil spring 63 is positioned with one end thereof being mounted on a spring seat at the drive lever 64 and the other end thereof contacting a stopper seat 62, so that the drive lever 64 is urged to locate on an extension of the drive bar 61 at all times but can be pivotally moved toward the unit plate 8 against the biasing force of the spring 63. The drive lever 64 is formed with the slot 64a for receiving the projection 59a connected to the other end of the drive arm 59 as described above.

Operation of the disk loading and unloading system of the aforesaid construction will now be described. FIG. 5 shows the disk 6 in a playing condition. The disk 6 having its center position decided by a tapering portion of the disk guide 13 is fixed in position by the attracting forces of the magnets 18 and 22 on the turntable 69 which is directly connected to the main motor 7, to rotate at the same r.p.m. as the main motor 7. The pickup (not shown) moves leftwardly and rightwardly along the guide opening 66 to read out information on the disk 6 by means of a laser. At this time, the disk loading mechanism is in a condition shown in FIGS. 2 and 4. The slider 35 and the elevation arms 32 are both in their lower positions as shown in FIG. 2 in which they are out of contact with the disk 6. The projection 59a at the other end of the drive arm 59 connected to the drive motor 57 is located in a position in which it is biased toward the forward end with respect to the slot 64a, and the drive motor 57 is inoperative. The roller 47 supported by each connecting bar 41 is away from the associated inclined surface 54 and remains stationary in the air.

The back plate 10, disk holder 11 and loading blind 16 are in their closed positions. The clamp holder 20 is pushed out as the projections 31 each push the associated clamp trigger 27 to rotate same, to press against the associated projection 28 to cause the associated clamp arm 24 to move in pivotal movement, with the magnets 18 and 22 being attracted to each other with the disk 6 being disposed therebetween.

Upon a close/open button 2a on the operation surface being depressed, the drive motor 57 begins to rotate. At the same time, the drive arm 59 directly connected to the drive motor 57 moves clockwise in pivotal movement, so that the projection 59a of the drive arm 59 presses the slot 64a of the drive lever 64 while moving rearwardly. Thus rotation of the drive motor 57 causes the drive bars 61, back plate 10 and disk holder 11 to move in pivotal movement in a clockwise direction about the projections 68 of the disk holder 11. As the disk holder 11 moves in pivotal movement, the extensions 27b of the clamp triggers 27 move away from the projections 31 connected to the unit plate 8. Thus in FIG. 2, the clamp triggers 27 have their extensions 27b move downwardly in the direction to the paper and their projections 27a move upwardly in the direction away from the paper. As a result, the clamp arms 24 are moved forwardly by the wire springs 26 shown in FIG. 4 in pivotal movement, in a direction in which the magnets 18 and 22 holding the disk 6 in position by their attracting forces are separated from each other. As the back plate 10 moves in pivotal movement, the support portions 43 also move in pivotal movement in the same direction as the back plate 10, so that the pivot arms 46 connected to the support portions 43 through the connecting bars 41 and the springs 52 also move in pivotal movement in the same direction as the back plate 10.

Figure 9:
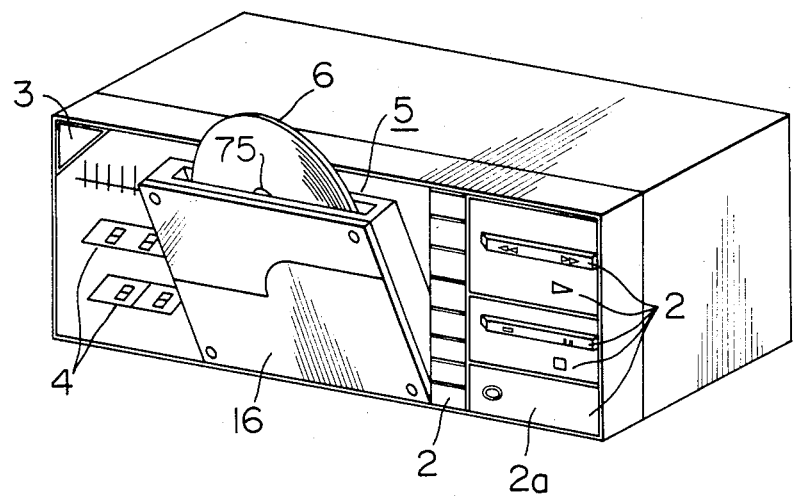
FIG. 9 is a perspective view of the compact digital audio disk player shown in FIG. 1, showing the disk in the upper position.
Figure 8:
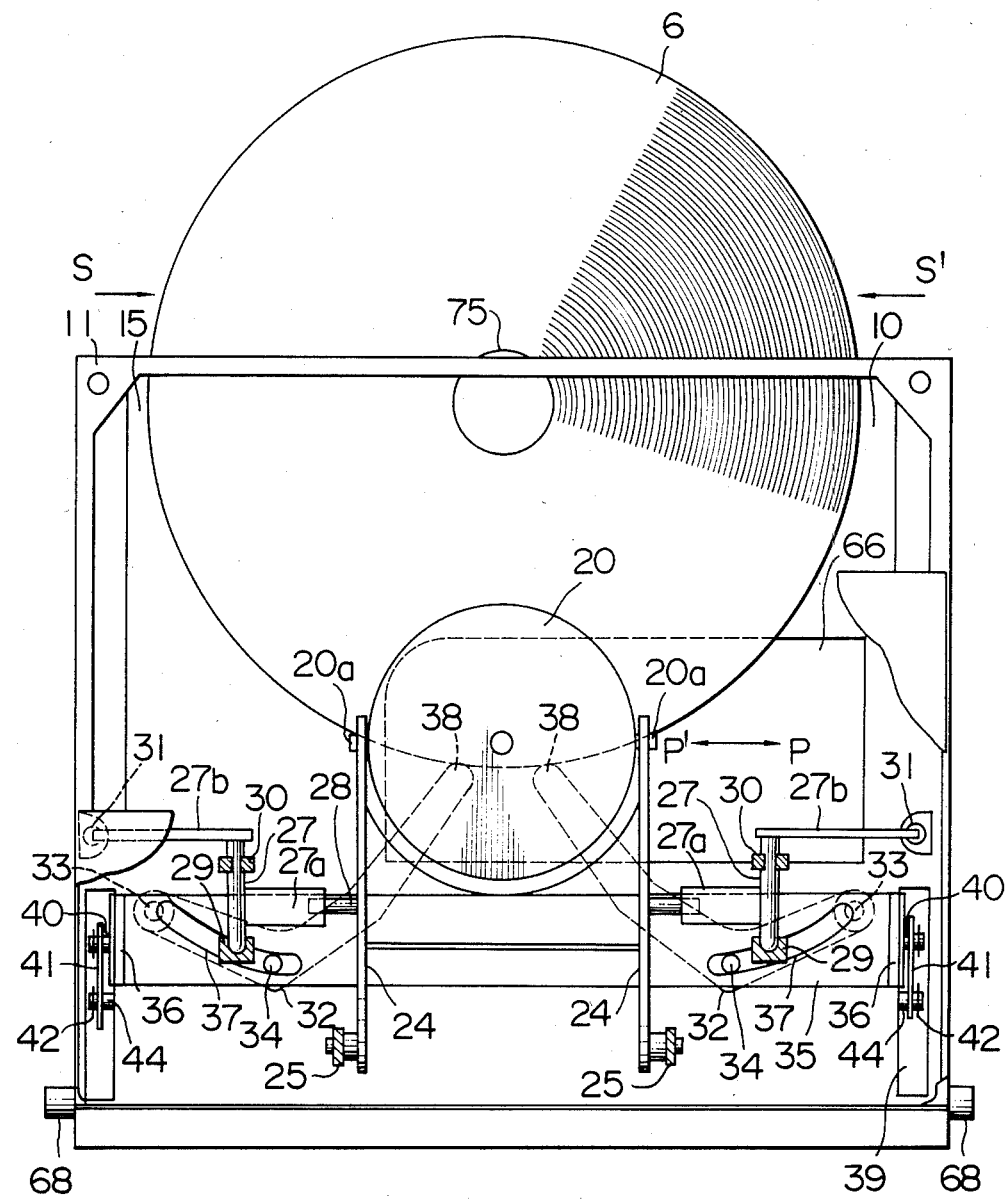
FIG. 8 is a front view of the disk loading mechanism shown in FIG. 2, showing the disk in the upper position.

Further pivotal movement of the connecting bars 41 and the pivot arms 46 brings the rollers 47 into contact with the inclined surfaces 54 at a point A shown in FIG. 7. Further pivotal movement of the support portions 43 brings the rollers 47 to a point B following its downward movement along the inclined surfaces 54. When the rollers 47 have reached point B, the drive bars 61 actuate a microswitch (not shown) to render the drive motor 57 inoperative. During the rollers 47 move from point A to point B, the connecting bars 41 and the pivot arms 46 both move in pivotal movement counterclockwise in the direction of an arrow C in FIG. 7 about the pivot axes 44, to positions as shown by solid lines. Pivotal movement of the connecting bars 41 moves the slider 35 upwardly as shown in FIG. 8. Meanwhile, since the clamp triggers 27 move away from the projections 31, the clamp holder 20 is returned by the biasing forces of the wire springs 26 wound around the clamp arms 24 until it abuts against the inner wall surface of the disk holder 11. Upward movement of the slider 35 in linear movement causes the slide projections 34 to move in sliding movement along the slots 37 in the slider 35, so that the elevation arms 32 move in pivotal movement about the shafts 33. Thus, the disk support portions 38 come into supporting the disk 6 and move upwardly to a position shown in FIGS. 8 and 9 in which the center opening of the disk 6 is exposed to view and from which the disk 6 can be manually removed with ease.

In FIG. 8, another compact disk can be held at points S and S' by the thumb and index fingers and inserted in the disk loading mechanism, after the disk 6 is removed as aforesaid. By depressing the open/close button, the drive motor 57 is actuated to move the slider 35 and the elevation arms 32 downwardly by a process which is in reverse of the process described hereinabove with reference to disk unloading. The disk 6 inserted in this way first abuts against a disk seat 67 (shown in FIG. 2) on the back plate 10 to be positioned with respect to the vertical. When the disk loading mechanism is closed, the center opening of the disk 6 is eccentrically guided by the center spindle 70. As the result, the disk 6 slightly moves upwardly along an inclined surface of the disk guide 13, so that finally a gap is defined between the disk 6 and the disk seat 67 and the disk 6 is placed in condition for playing as shown in FIGS. 2, 4 and 5.

Figure 6:
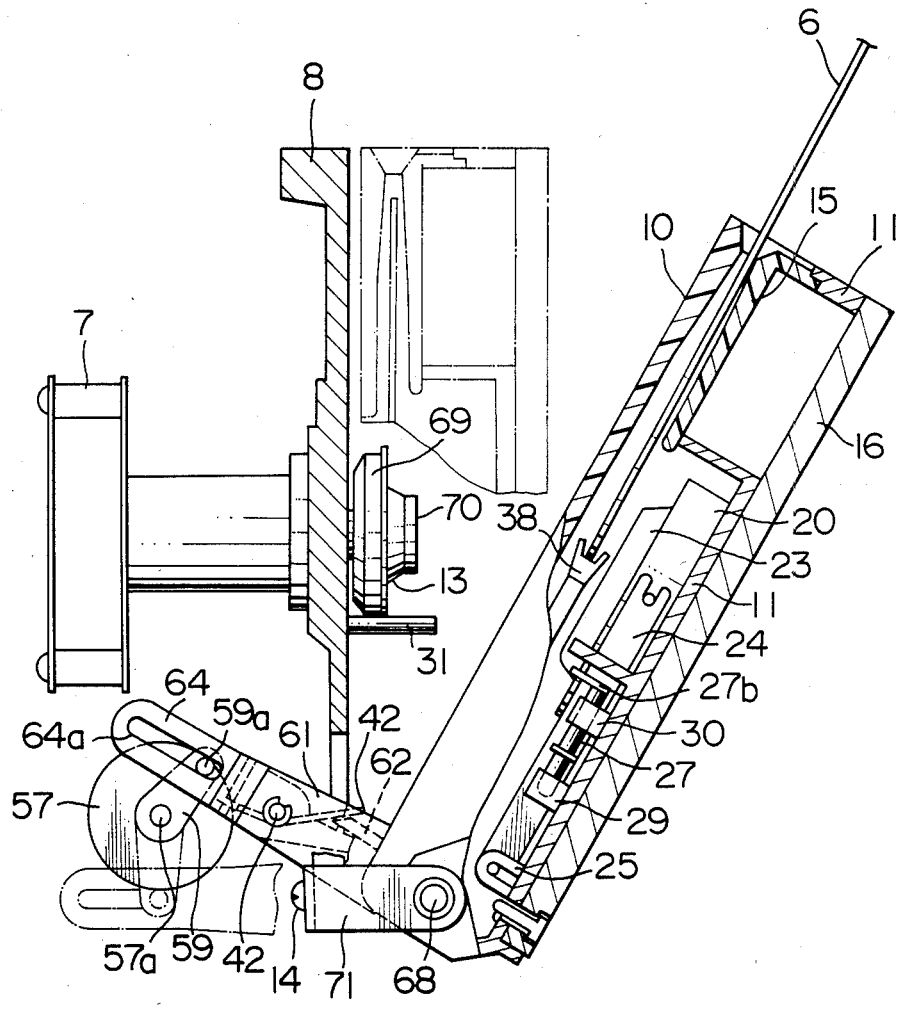
FIG. 6 is a side view, with certain parts being shown in section, of the drive motor system showing the disk holder in an open position.
Figure 10:
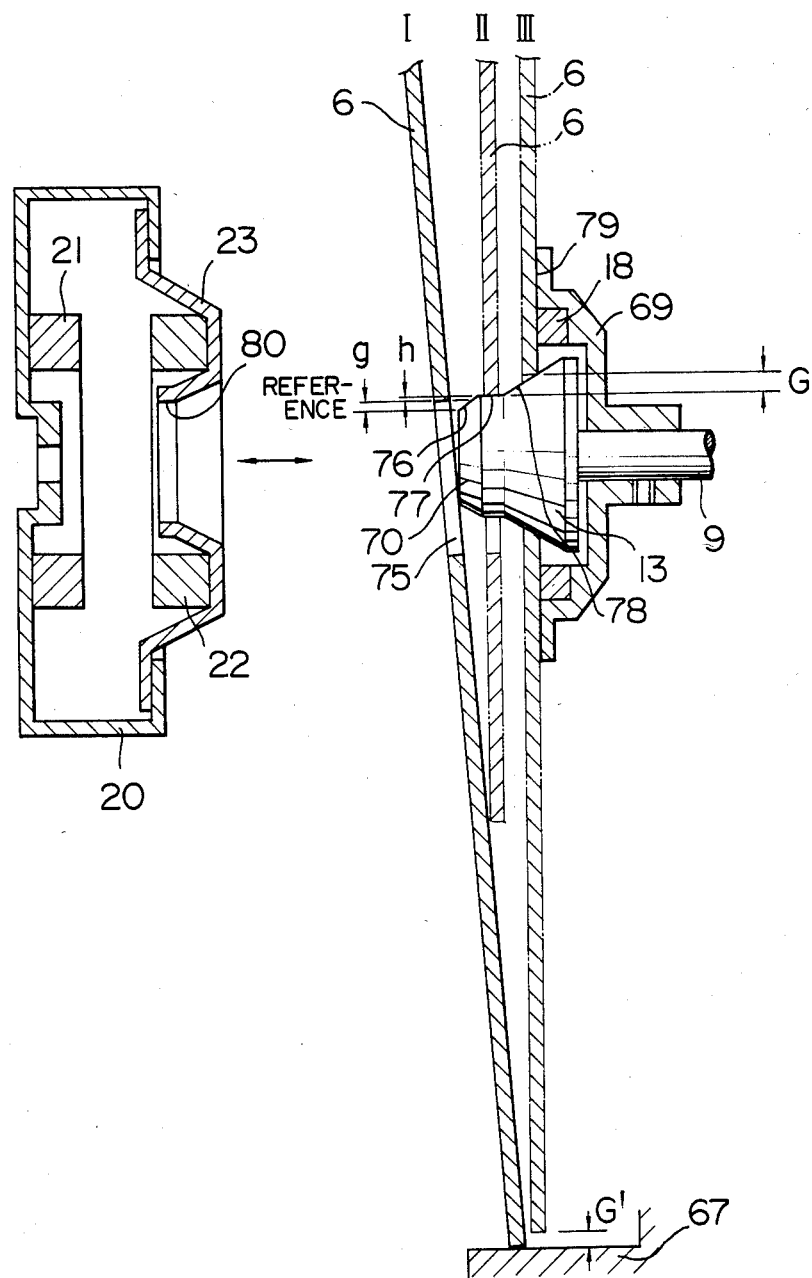
FIG. 10 is a side view, with certain parts being shown in section, of the disk loading mechanism showing the disk in relation to the center spindle, disk guide and disk seat.

FIG. 10 is a side view, with certain parts being shown in section, of the disk 6 and the disk guide 13 in explanation of the aforesaid process for placing the disk in condition for playing. The disk loading process will be described. After the disk 6 is inserted in the disk loading mechanism as shown in FIG. 6, the open/close button 2a (shown in FIG. 1) is depressed. The drive motor 57 is actuated to rotate in a direction for closing the disk loading mechanism 5. As the motor 57 rotates, the disk 6 moves downwardly until its outer peripheral edge abuts against the disk seat 67 on the back plate 10. The slider 35 (FIG. 2) continues to move downwardly and stops in a position in which it clears the outer peripheral edge of the disk 6. At this time, an upper edge of the center opening 75 of the disk 6 is positioned against a first inclined surface 76 of the center spindle 70 and has at least a guide value g shown in FIG. 10. The disk seat 67 is provided in a position in which the aforesaid relation between the disk 6 and the center spindle 70 holds (condition I). From this condition, the disk 6 is moved as the disk clamper 23 and the clamp holder 20 move toward the disk 6, so that the central portion of the disk 6 tends to be forced against the center spindle 70. As the disk 6 is further pressed by the clamp holder 20 and the disk clamper 23, the disk 6 moves upwardly by an amount corresponding to h as shown in FIG. 10, so that the upper edge of the center opening 75 rides on a vertical outer peripheral portion 77 of the disk guide 13 (condition II). Further movement of the disk 6 results in the disk 6 moving upwardly along a second inclined surface 78 of the disk guide 13 by an amount corresponding to G, so that the center of the disk 6 is brought into alignment with the center of the disk guide 13 fitted to the main shaft 9 of the main motor 7. Meanwhile a main surface of the disk 6 abuts against a support surface 79 of the turntable 69 to be disposed perpendicular to the main shaft 9. Thus, the disk 6 can be accurately positioned with respect to the turntable 69 for rotation as the main motor 7 rotates, without the risks of the surface and the outer periphery thereof becoming wobbly.

The outer periphery of the disk 6 is spaced apart from the disk seat 67 by a gap G'. The gap G' corresponds to the value of h by which the disk 6 moves upwardly as the upper edge of the center opening 75 rides on the first inclined surface 76 plus the value of G by which the disk 6 moves upwardly as the upper edge of the center opening 75 rides on the second inclined surface 78. Thus, the disk 6 is prevented from coming into contact with the disk seat 67 during rotation (condition III). When the disk 6 is in condition III for playing, the magnet 18 and the magnet 22 on the disk clamper 23 attract each other to keep the disk 6 in position, while the magnet 22 and the magnet 21 on the clamp holder 20 repel each other. A guide wall 80 of the disk clamper 23 is in engagement with the vertical outer peripheral portion 77 of the disk guide 13 to hold the disk 6 in place and rotates with the disk 6, without coming into contact with any part within the clamp holder 20.

When the disk 6 is removed from the disk guide 13 and the center spindle 70 after being placed in the playing position, the disk clamper 23 and the clamp holder 20 are first separated from the disk 6 from the position shown in FIGS. 2, 4 and 5 in which the disk 6 is in condition for playing, as the disk loading mechanism is opened. Then, the center opening 75 of the disk 6 is released from the disk guide 13 and the center spindle 70 successively, as the disk 6 moves forwardly in pivotal movement while the outer peripheral edge of the disk 6 abuts against the inner wall surface of the back plate 10. Thereafter, the slider 35 shown in FIG. 2 moves in linear movement as the drive motor 57 rotates and the elevation arms 32 move upwardly in pivotal movement to lift the disk 6 held by the disk supports 38 to positions shown in FIGS. 7, 8 and 9.

From the foregoing description, it will be appreciated that in the disk loading and unloading system according to the invention, the disk can be moved upwardly to a position in which the center opening thereof is exposed to view, after playing of the disk is finished, and the disk has only to be inserted in the player to this position when it is loaded. This enables the disk to be held at points S and S' by one hand in loading and unloading disk, without soiling or damaging the surfaces of the disk in which information is stored by hands that come into contact therewith.

The accuracy with which the disk is automatically placed in condition for playing after being loaded in the player by the disk loading and unloading system according to the invention is increased, and reliability of the system is improved because when the disk is loaded, the disk is moved downwardly and the upper edge of the center opening of the disk is first brought into contact with the first inclined surface of the disk guide with a predetermined guide value g and then the disk is correctly positioned at the center when the upper edge of the center opening is brought into contact with the second inclined surface of the disk guide. This eliminates the danger of the disk being damaged due to its failure to be correctly placed in position.

We claim:

1. A disk loading and unloading system comprising:
   a main body including a spindle section that can be fitted in a center opening of a disk;
   a disk holding section formed with an opening for inserting and withdrawing said disk, said disk holding section having a clamper section disposed on a side of an inserted disk opposite from said spindle section and said clamper section being adapted to be fitted on said spindle section, said disk holding section being connected to said main body and pivotally movable between a first position in which said spindle section is fitted in the center opening of said disk and in said clamper section to hold the disk in place and a second position in which said spindle section is released from engagement with said clamper section and said disk to release the disk;
   push-out means mounted in said disk holding section, said push-out means being operative to push at least a portion of the disk out of the disk holding section through the disk inserting and withdrawing opening when the disk holding section is moved from the first position to the second position; and
   wherein said spindle section comprises a center spindle connected to a forward end of a main shaft of a main motor, and a disk guide fitted on said main shaft for axial sliding movement and resiliently urged to move toward said center spindle, said center spindle being formed at its outer periphery with a first inclined surface portion and said disk guide being formed at its outer periphery with a second inclined surface portion inclined outwardly for a greater length than said first inclined surface portion, and wherein said clamper section has a clamper allowing, when the disk holding section moves from the second position to the first position, the edge of the center opening of the disk to come into contact with the first inclined surface portion of the center spindle.

2. A disk loading and unloading system as claimed in claim 1, wherein said push-out means pushes the disk out of the disk holding section in such a manner that the disk is exposed to view from an outer peripheral edge thereof to at least the vicinity of the center opening thereof.

3. A disk loading and unloading system as claimed in claim 1, wherein said push-out means comprises a slider operative to move in linear movement in conjunction with the movement of the disk holding section from the first position to the second position, and elevation members linked to said slider to move in pivotal movement as the slider moves in linear movement.

4. A disk loading and unloading system as claimed in claim 3, wherein said elevation members are each formed with a disk support portion for supporting the disk whereby the disk support portions supporting the disk are operative to push the disk outwardly of the disk holding section when the elevation members move in pivotal movement.

5. A disk loading and unloading system as claimed in claim 1, further comprising a drive motor for moving the disk holding section from the first position to the second position.

6. A disk loading and unloading system as claimed in claim 5, further comprising a linkage operative, when the disk holding section moves from the first position to the second position as the drive motor is actuated, to render said push-out means operative to push at least a portion of the disk from the disk holding section in conjunction with the movement of the disk holding section moving in pivotal movement.

7. A disk loading and unloading system as claimed in claim 3, further comprising a drive motor for moving the disk holding section from the first position to the second position.

8. A disk loading and unloading system as claimed in claim 7, further comprising a linkage operative, when the disk holding section moves from the first position to the second position as the drive motor is actuated, to render said push-out means operative to push at least a portion of the disk from the disk holding section in conjunction with the movement of the disk holding section moving in pivotal movement.

9. A disk loading and unloading system as claimed in claim 5, further comprising a pushbutton located on a front panel of the main body to render the drive motor operative when depressed.

10. A disk loading and unloading system as claimed in claim 7, further comprising a pushbutton located on a front panel of the main body to render the drive motor operative when depressed.

11. A disk loading and unloading system as claimed in claim 1, wherein said clamper comprises a disk clamper capable of forcing the vicinity of the center opening of the disk against the center spindle, whereby the disk is guided first by the first inclined surface portion of the center spindle and then by the second inclined surface portion of the disk guide as the disk is forced by the disk clamper against the center spindle to be thereby finally placed in a predetermined playing position.

* * * * *